United States Patent [19]

Legault

[11] Patent Number: 5,282,562
[45] Date of Patent: Feb. 1, 1994

[54] VEHICLE ROOF-TOP SUPPORT RACK WITH PERMANENT ATTACHMENT BASES

[76] Inventor: Stephane Legault, 4750 Geneviève, Pierrefonds, Quebec H9J 1S5, Canada

[21] Appl. No.: 971,474
[22] Filed: Nov. 4, 1992
[51] Int. Cl.⁵ .............................................. B60R 9/00
[52] U.S. Cl. ...................................... 224/329; 224/326
[58] Field of Search ................. 224/322, 329, 330, 331, 224/325, 326

[56] References Cited

U.S. PATENT DOCUMENTS

| 4,516,709 | 5/1985 | Bott | 224/325 X |
| 4,728,019 | 3/1988 | Olliges | 224/329 |
| 4,995,538 | 2/1991 | Marengo | 224/329 |

FOREIGN PATENT DOCUMENTS

2556667 6/1985 France .

*Primary Examiner*—Renee S. Luebke
*Attorney, Agent, or Firm*—Longacre & White

[57] ABSTRACT

A vehicle rack for securement over the roof of a vehicle is described. The rack comprises a support rail having opposed supporting brackets for maintaining the rail elevated transversely over a vehicle roof. The brackets are removably connected to a respective one of a pair of connecting bases. Each of the connecting bases is attached to a restraining portion of a vehicle adjacent the roof thereof with the connecting bases positioned on a respective side of the roof. The connecting bases are interconnected by a flexible connecting strap which extends therebetween. A tension force is applied between the attachments of the pair of connecting bases to rigidly connect the bases on the roof. One of the connecting bases is a locking base provided with a latch engageable element. One of the supporting brackets is a locking bracket having a latch mechanism actuable by a lever arm for engaging the latch engageable element of the locking base to immovably secure the brackets to the connecting bases. The other of the connecting bases is provided with a bracket connection. The other supporting bracket is provided with an engageable element to engage with the connecting element of the other connecting base, and the other supporting bracket is automatically disconnected by lifting the locking bracket from the locking base.

23 Claims, 8 Drawing Sheets

VEHICLE ROOF-TOP SUPPORT RACK WITH PERMANENT ATTACHMENT BASES

TECHNICAL FIELD

The present invention relates to a support rack for a vehicle and securable over the roof of the vehicle and wherein the rack comprises a rail supported elevated by a pair of supporting brackets, with the brackets and the rail being removably connected to a pair of connecting bases which remain secured on the vehicle roof, and further wherein the rail and its support brackets can be easily and securely connected to the bases when required.

BACKGROUND ART

Various vehicle rooftop racks are known to transport articles. However, the majority of these racks are not made to install and remove with each use because they are time consuming to install, or if they are easy to install and remove, they are not strong enough to carry heavy objects.

French Patent No. 84 19281 published on Jun. 21, 1985 under Publication No. 2556667 relates to a rooftop vehicle rack wherein attachments are secured to the roof to provide connection and removal of rail brackets. Each bracket has a clamp to attach to a gutter element provided with the attachments. Accordingly, it is necessary to latch all four brackets individually, and this becomes time consuming and awkward. The attachments are arcuately formed and designed to suit a specific vehicle and therefore not practical.

SUMMARY OF INVENTION

It is therefore a feature of the present invention to provide an improved universal vehicle rack for securement over the roof of a vehicle and which substantially overcomes the above-mentioned disadvantages of existing racks.

A further feature of the present invention is to provide a vehicle rack for securement over the roof of a vehicle and wherein the rack comprises a transport support rail having opposed supporting brackets which are removably connected to connecting bases which are connectable to most types of vehicles and which remain secured on the roof of a vehicle, and wherein the racks are attached from a single side of the vehicle.

Another feature of the present invention is to provide a universal vehicle rack for securement over the roof of a vehicle and which is easily connected and disconnected from connecting bases which remain on the roof, and wherein the rail and the supporting brackets are easily disconnected from one another for ease of storage.

Another feature of the present invention is to provide a universal vehicle rack for securement over the roof of a vehicle and wherein various article support elements are connectable to the support rail.

According to the above features, from a broad aspect, the present invention provides a vehicle rack for securement over the roof of a vehicle. The rack comprises a support rail having opposed supporting brackets for maintaining the rail elevated transversely over a vehicle roof. The brackets are removably connected to a respective one of a pair of connecting bases. Each of the connecting bases has attachment means for attaching same to a restraining portion of a vehicle adjacent the roof thereof with the connecting bases positioned on a respective side of the roof. Connecting means is connected to the connecting bases to secure said bases. Tensioning means is provided for applying a tension force between the attachment means of the pair of connecting bases and the connecting means to rigidly connect the connecting bases on the roof. One of the connecting bases is a locking base provided with a latch engageable element. One of the supporting brackets is a locking bracket having a latch mechanism actuable by a lever arm for engaging the latch engageable element of the locking base to immovably secure the brackets to the connecting bases. The other of the connecting bases is provided with a bracket connection. The other supporting bracket is provided with an engageable element to engage with the connecting element of the other connecting base, and the other supporting bracket is automatically disconnected by lifting the locking bracket from the locking base.

BRIEF DESCRIPTION OF DRAWINGS

A preferred embodiment of the invention will now be described with reference to the accompanying drawings in which.

DESCRIPTION OF PREFERRED EMBODIMENTS

Figure 1:
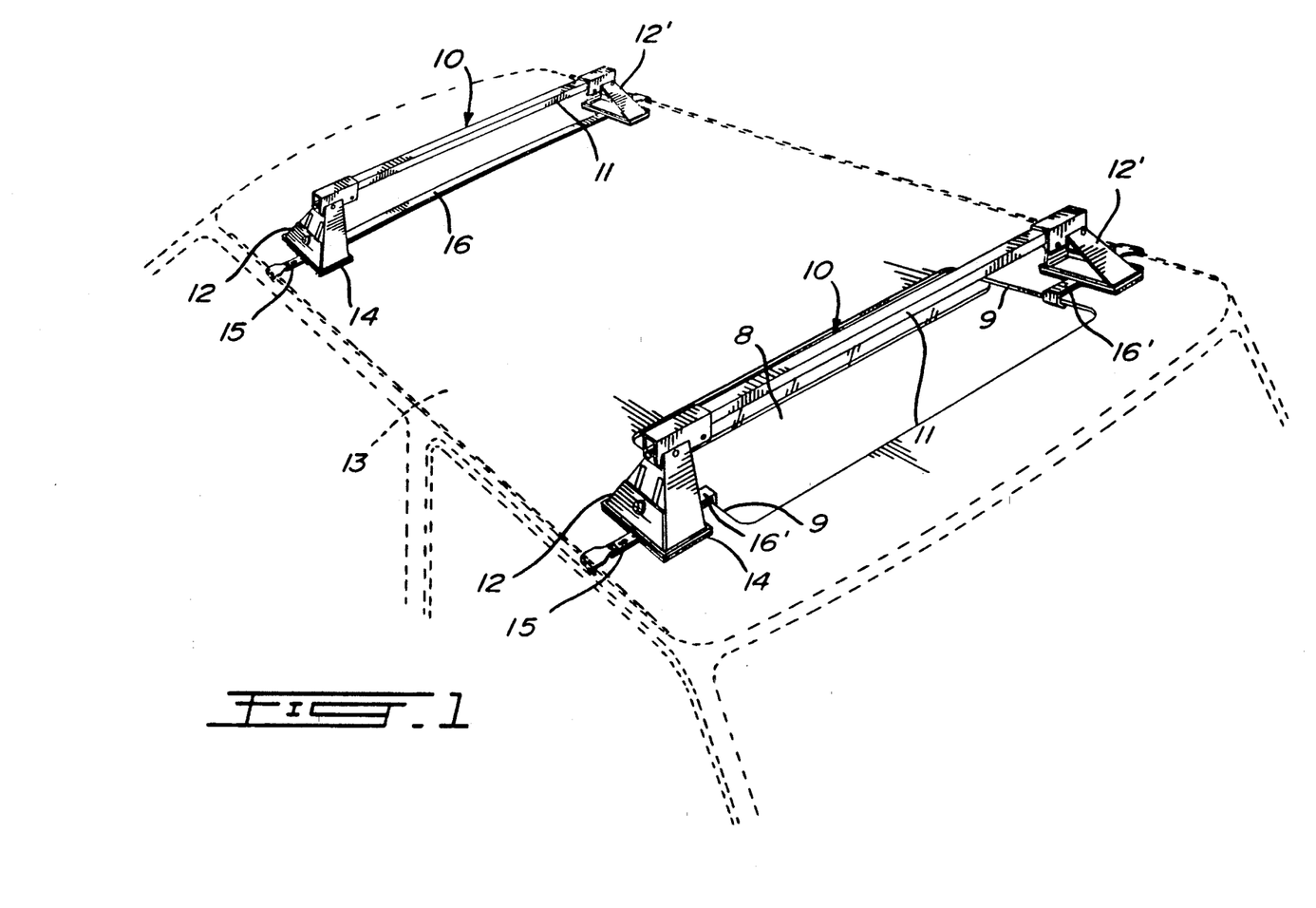
FIG. 1 is a perspective view showing a pair of vehicle racks constructed in accordance with the present invention and connected over the roof of a vehicle.
Figure 2:
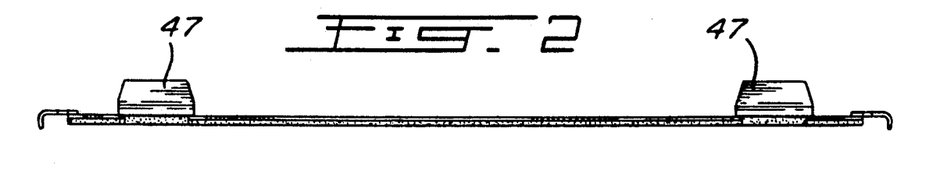
FIG. 2 is an end view of FIG. 1 showing the connecting bases without the support rail and brackets connected thereto.
Figure 3:
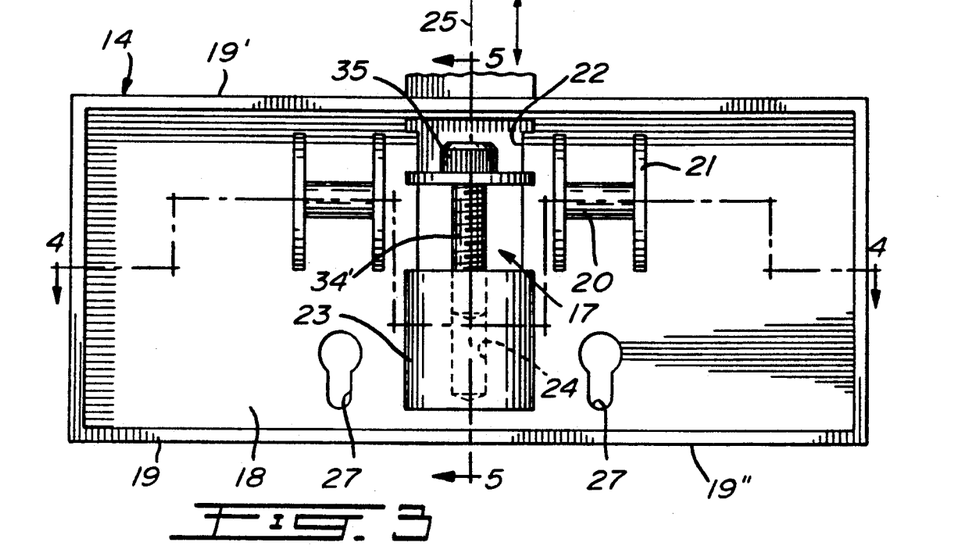
FIG. 3 is a top view of the locking connecting base.
Figure 6:
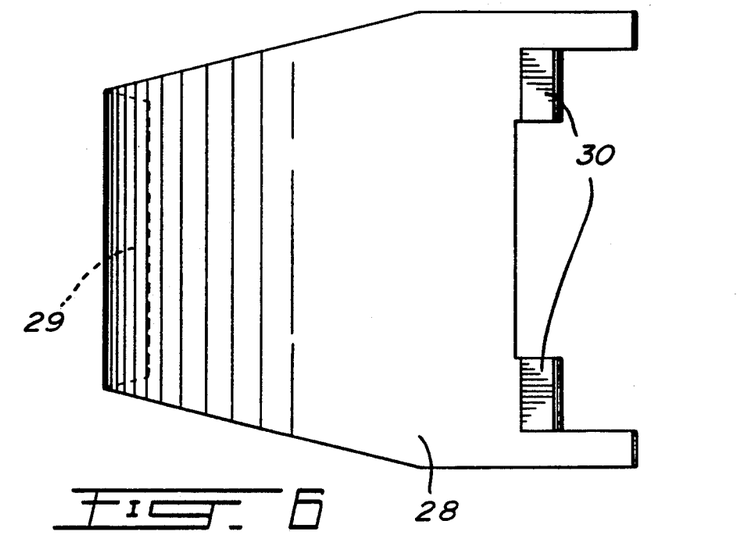
FIG. 6 is a top view of the attachment hook plate.
Figure 7:
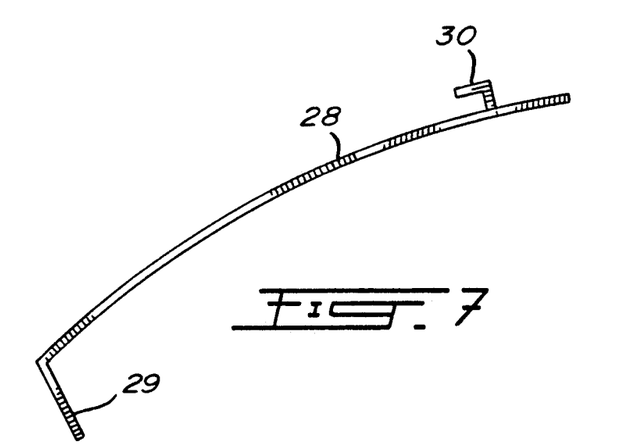
FIG. 7 is a side view of FIG. 6.

Referring now to the drawings, and more particularly to FIGS. 1 and 2, there is shown generally at 10 the vehicle rack of the present invention and which comprises essentially a support rail 11 having opposed supporting brackets 12, which maintain the rail elevated transversely over a vehicle roof 13. The brackets 12 are removably connected to a respective one of a pair of connecting bases 14, each of which is attached to the vehicle roof 13 on a respective side thereof by attachment means in the form of a hook assembly 15 or a hook plate 28, as shown in FIGS. 6 and 7. Flexible or rigid connecting means 16 in the form of a metal band, or a band having at least a portion thereof made of stretchable material, is interconnected between the connecting bases 14. The connecting bases are rigidly secured to the roof 13 by tensioning means which may consist of a pulling force exerted by the flexible band 16, or an adjustable tensioning mechanism 17, as shown in FIG. 3. Only one of the brackets of each rack has a latch mechanism to lock the rack to the bases and accordingly the rack is secured from one side of the vehicle only.

Figure 4:
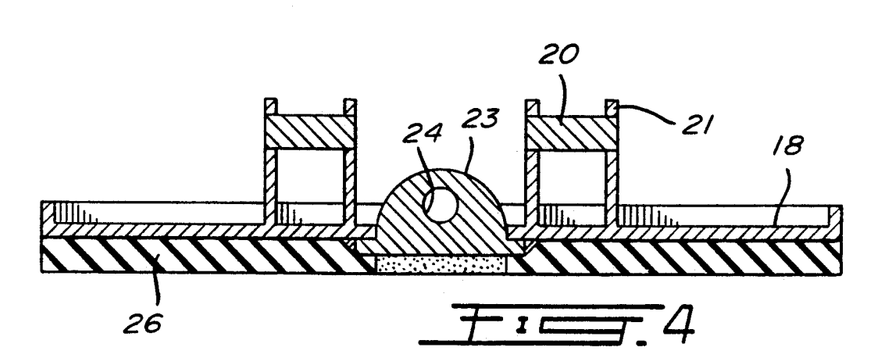
FIG. 4 is a side view of FIG. 3.
Figure 5:
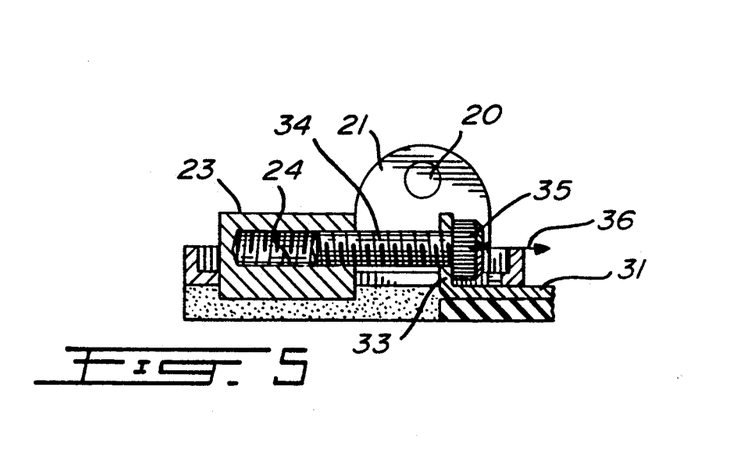
FIG. 5 is an end view of FIG. 3.
Figure 8:
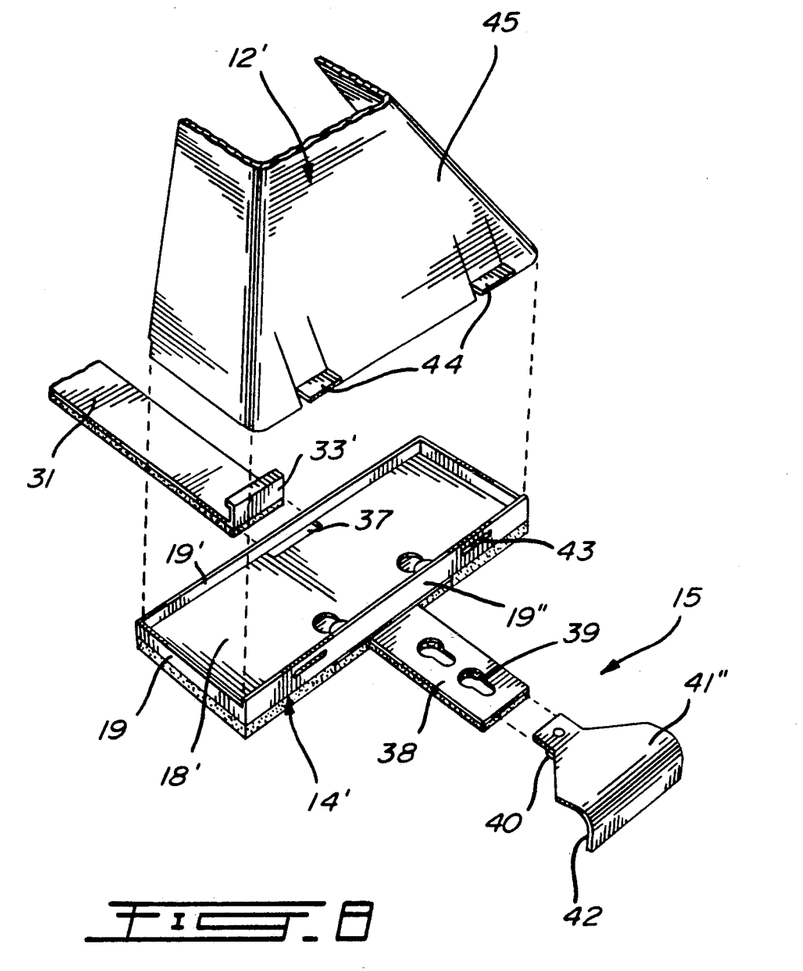
FIG. 8 is an exploded view of the connecting base, bracket and the attachment hook plate of the bracket not provided with the latch mechanism.

Referring now to FIGS. 3 to 11, there will be described the construction and operation of the connecting bases which are secured to the vehicle roof. One of the connecting bases 14 is a locking base, as shown in FIGS. 3 to 5, and provided with an adjustable tensioning mechanism 17. The other connecting base is illustrated at FIG. 8. As shown in FIGS. 3 to 5, the locking base is a generally rectangular base having a flat bottom wall 18 and a short circumferential side wall 19. A latch engageable means in the form of a pair of fixed transverse pins 20 are secured elevated from the base wall 18 inbetween a pair of vertical flanges 21. These latching engageable means or transverse pins 20 are positioned to each side of an opening 22 disposed on the central transverse axis of the base wall adjacent an inner longitudinal edge 19' of the base wall. The adjustable tensioning mechanism 17 comprises a connecting housing 23 secured above the base wall 18 adjacent the opening 22 and has a threaded bore 24 therein aligned with the central transverse axis 25. A cushioning material, herein a rubber pad 26, is secured over the rear face of the base wall 18 to protect the vehicle roof.

A pair of apertures 27 is also provided in the base wall 18 adjacent an outer edge 19'' thereof for removable securement of the metal strap 38, as shown in FIG. 8. Alternatively, slots (not shown) may be formed in the base wall 18' to receive hooks 30 of a hook plate 28. These apertures also provide drainage for water falling on the base wall 18 of the base 14. The hook plate 28 is formed of metal and has a slight curved wall and a hook end 29 for clamping retention with a restraining portion of the vehicle adjacent the roof thereof, such as a gutter or the top edge of a door opening. The other end of the hook plate is formed with attachment fingers, herein in the form of a pair of outwardly facing hooks 30, which engage into respective apertures 27 provided in the base wall 18 of the locking connecting base 14. The drawings illustrate the preferred hook assembly 15 shown in FIG. 8.

Figure 9:
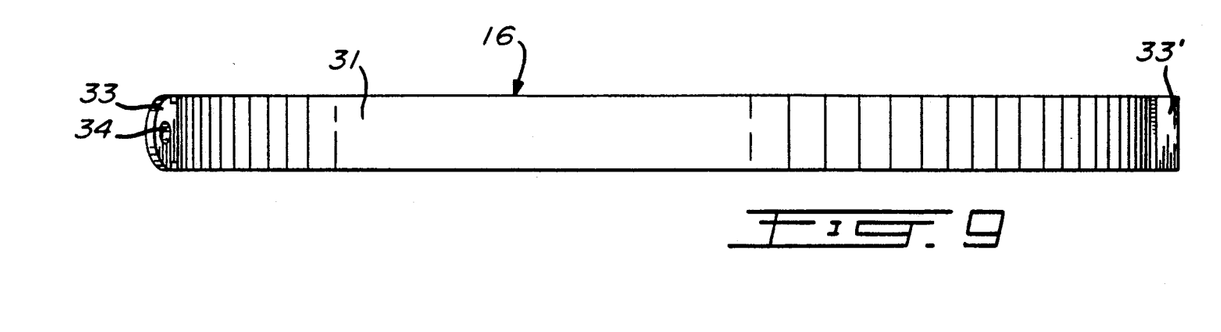
FIG. 9 is a top view of the connecting band.
Figure 10:
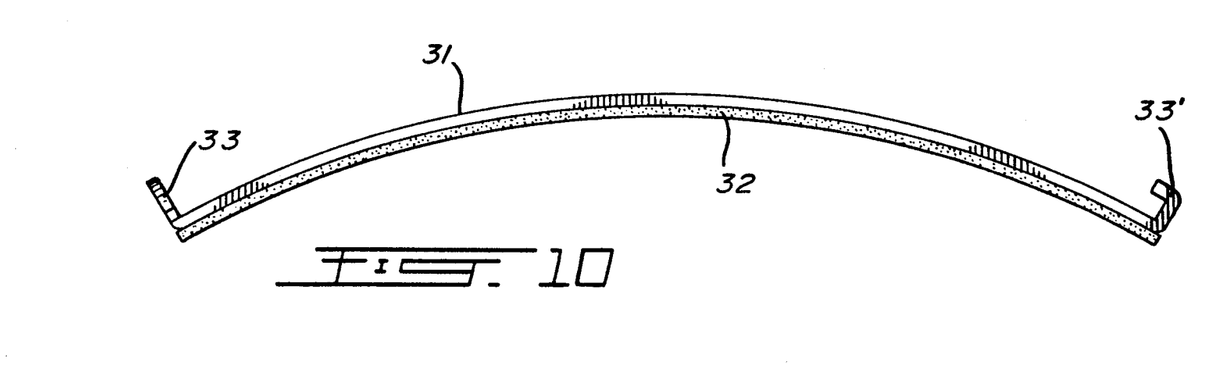
FIG. 10 is a side view of FIG. 9.

As shown in FIGS. 9 and 10, the flexible connecting means 16 is herein constituted by a band 31 of metal having a protective material 32 over the rear face thereof. The band 31 may have a slight curvature, as shown in FIG. 10, and has upwardly turned end portions 33 provided with an aperture 34. The other end has a hook formation 33'. The end portions 33 constitute a vertical end wall with one of these end walls extending in the opening 22 in the base wall 18 of the locking connecting base 14. As shown in FIG. 5, one end wall 33 is connected to the threaded housing 23 by a threaded bolt 34 having a head 35 for receiving the end of a tool, such as a screwdriver or allen key (not shown), to cause the band 31 to be displaced in the direction of arrow 36 to apply tension between the connecting bases 14 and the hook plates 28 secured to the vehicle gutters of the edge of the door opening. Accordingly, the connecting bases are rigidly and immovably secured to the roof of a vehicle in a position to receive the supporting brackets and the rail therein.

The other end wall 33 of the band 31 is connected to the other connecting base 14', as shown in FIG. 8, by simply inserting the end wall 33 into a slot 37 formed adjacent the inner circumferential wall 19'. As shown in FIG. 8, the hook plate 28' is herein constituted by a metal strap 38 secured to the base wall 18' of the connecting base 14' and provided with a series of attaching apertures 39 to receive therein an attaching pin 40 secured to the end of a hook bracket 41 having a hook end 42 to engage with a vehicle gutter or the edge of a door frame. The outer wall 19'' of the circumferential wall 19 is also provided with a pair or more of slots 43 to receive the prongs 44 formed in an outer side wall 45 of one of the support brackets, herein bracket 12', which is not provided with a latch mechanism, as will be described later.

Figure 11:
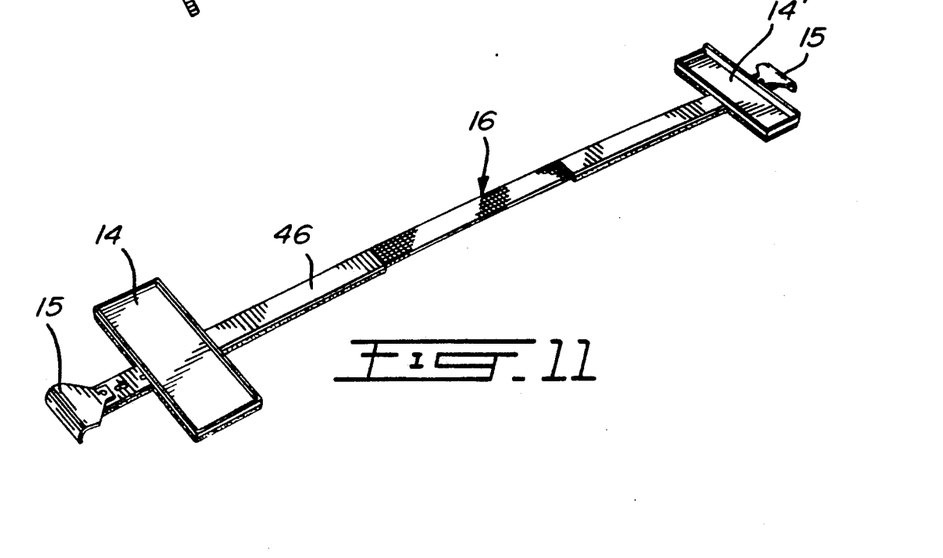
FIG. 11 is a perspective view showing a modification of the flexible connecting means, and herein constituted by a band having at least a portion thereof constructed of stretchable material.

As shown in FIG. 11, the flexible connecting means 16 may also be formed as a belt of stretchable material, or having at least a portion thereof as shown at 46 made of stretchable material. Accordingly, the belt also constitutes a tension means for securing the connecting bases 14 and 14' to the vehicle roof. The housing is installed by firstly connecting one of the hook plates 28 to the gutter on one side of the vehicle and by pulling on the other hook plate 28 on the other side of the vehicle. The band 16 is stretched with the other hook plate being attached to the gutter. The pulling force in the stretchable band then retains the assembly connected on the roof. However, the preferred embodiment is the adjustable tensioning means 17 and the rigid band 31 whereby the support connecting bases are more rigidly connected to support heavy loads and cannot be removed without the use of a special hand-tool necessary to turn the threaded bolt 34.

Figure 16:
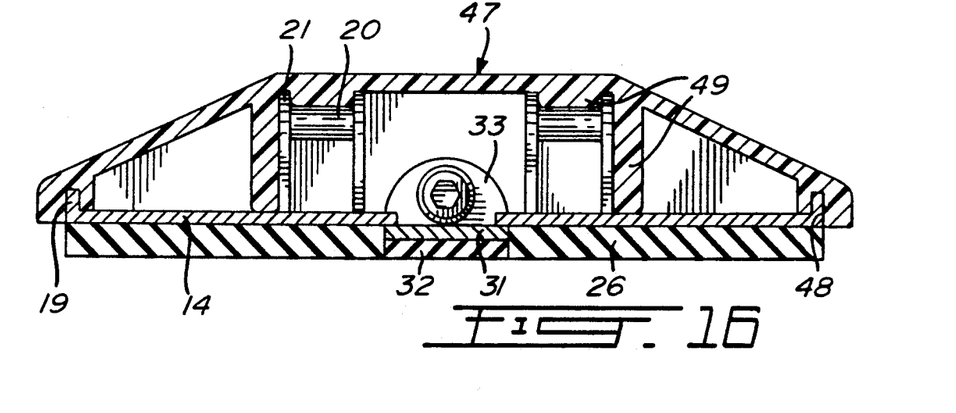
FIG. 16 is a sectional side view of a cap secured over the connecting base.

When the rack is not in use the connecting bases 14 and 14' may be provided with a cap 47, as shown in FIGS. 2 and 16. The cap 47 is formed of a flexible rubber-like material and provided with a circumferential slot 48 to receive the circumferential wall 19 of the base 14 in friction fit therein. Other inner depending ribs 49 may also be provided to rigidly connect the cap over the bases. As shown in FIG. 16, the cap also has an aerodynamic design to prevent wind resistance and noise. The cap, the connecting bases and band may also be painted with a color to blend with the color of the vehicle.

Figures 12, 13:
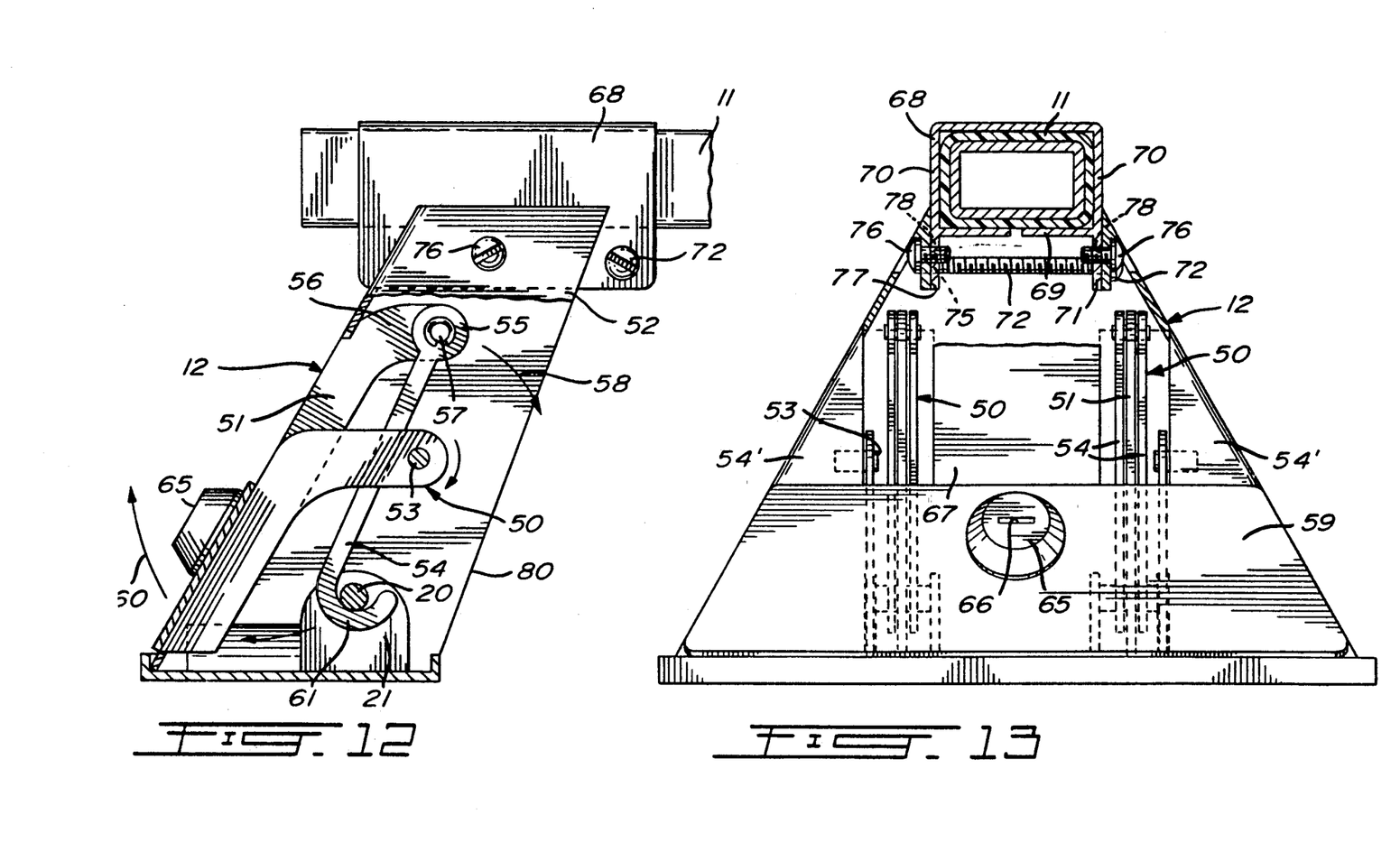
FIG. 12 is a fragmented side view showing the construction of a locking support bracket.
FIG. 13 is an end view of FIG. 12.

Referring now to FIGS. 12 to 15, there will be described the construction and operation of the supporting bracket, and more specifically the locking supporting bracket 12 which is a very important characteristic of this invention. As herein shown, the locking support bracket 12 is provided with a latch mechanism 50 for engaging the latching engageable means or transverse pins 20 extending above the base wall of the locking connecting base 14. The latch mechanism 50 comprises a lever arm 51 which is pivotally secured between opposed support side walls 52 of the locking bracket 12 and displaceable on a fixed rotation axis about a transverse pin 53 secured to a bracket 54 inwardly of the side wall 52. As shown in FIG. 13, there are two latch mechanisms 50 spaced apart within the locking bracket 12, and only one need be described herein as they are both identical. A latch element 54 is pivotally attached at a top end 56 to a latch pivot pin 57 in a top part of the lever arm 51 above the fixed axis of rotation which is the transverse pin 53. The pivot pin 57 interconnects the top end 55 of the latch element 54 to the top end 56 of the lever arm 51. Accordingly, the pivot connection or pin 57 of the latch element 54 is displaceable on an arc 58 extending about the fixed rotation axis or transverse pin 53. Finger engaging means in the form of a plate 59 of FIG. 13 is secured to the lever arm(s) 51 to displace the arms on the fixed rotation axis, transverse pin 53.

Figure 14A:
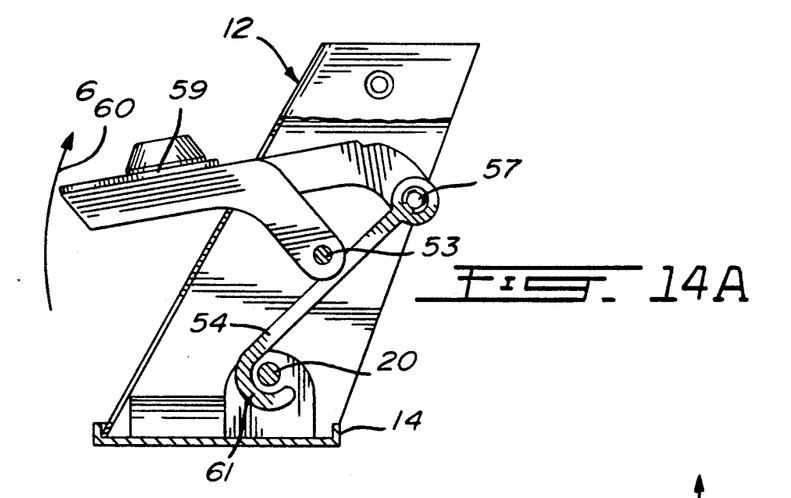
FIGS. 14A and 14B are simplified views showing the operation of the latch mechanism of the locking support bracket.
Figure 14B:
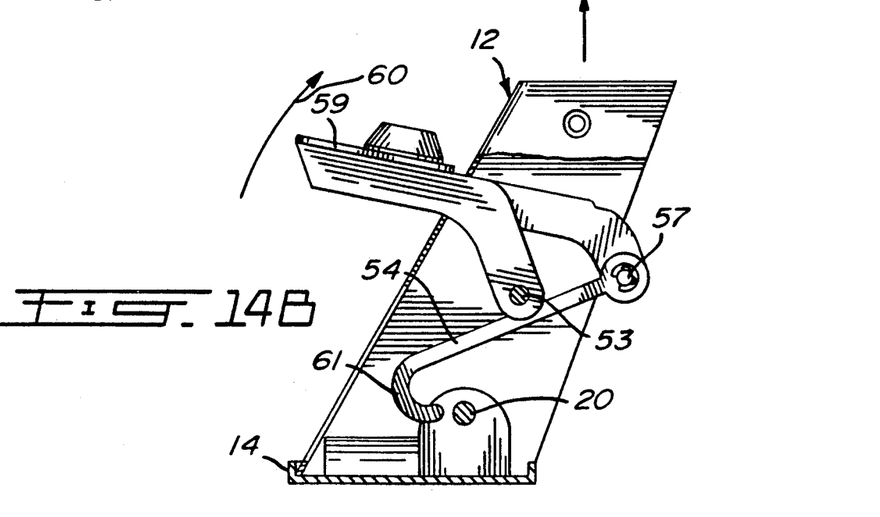

As shown in FIG. 13, the latch element 54 is a flat plate-like latch formed of two latch sections positioned on each side of the lever arm 51. With further reference to FIGS. 14A and 14B, it can be seen that by lifting the finger engaging plate 59 outwardly in the direction of arrow 60 thereby retracting same from the locking bracket, the free hook end 61 at the bottom of the latch element causes the latch pivot connection or pivot pin 57 to be displaced in a predetermined direction on the arc 52, forwardly as indicated by that arc, about the fixed pivot transverse pin 53. This causes the hook end 61 to firstly move downwardly, as shown in FIG. 14A, and out of engagement with its associated transverse pin 20 secured to the locking connecting base 14. As the plate 59 is further moved outwardly, as shown in FIG. 14B, the latch element abuts the transverse pin 53 and slides downwardly thereon so as to wedge it or guide the latch element and the hook end 61 away from the transverse pin 20 to permit the removal of the locking bracket 12, moving it upwardly, from the locking connecting base 14 and at the same time disengaging the opposed bracket 12' from the opposed base 14', as shown in FIG. 8.

A key lock housing 65 having a key slot 66 therein is mounted on the plate 59 to lock the plate onto an outer transverse wall 67 of the bracket 12 to prevent removal of the rack from the bases.

Each bracket 12 and 12' is provided with a pivotal rail connector 68 in a top portion thereof for removably connecting the rail 11 thereto. The rail connector is herein constituted by a hollow tubular housing of rectangular cross-section and dimensioned for receiving, in sliding fit therein, an end portion of the rail 11. The bottom wall 69 of the connector is slit and the side walls 70 have lower extensions 71 which connect to a clamping screw 72 whereby rotation of the clamping screw applies clamping pressure between the side walls 70 to frictionally retain the rail 11 therein. The other pivotal rail connector 68 may have an end wall to receive the other end portion of the rail 11 therein, and need not have a locking screw 72 secured thereto, as once the rail is connected to the connector 68 of the locking bracket 12, it cannot be detached from the other rail connector in the other non-locking bracket 12', as is obvious.

Figure 15:
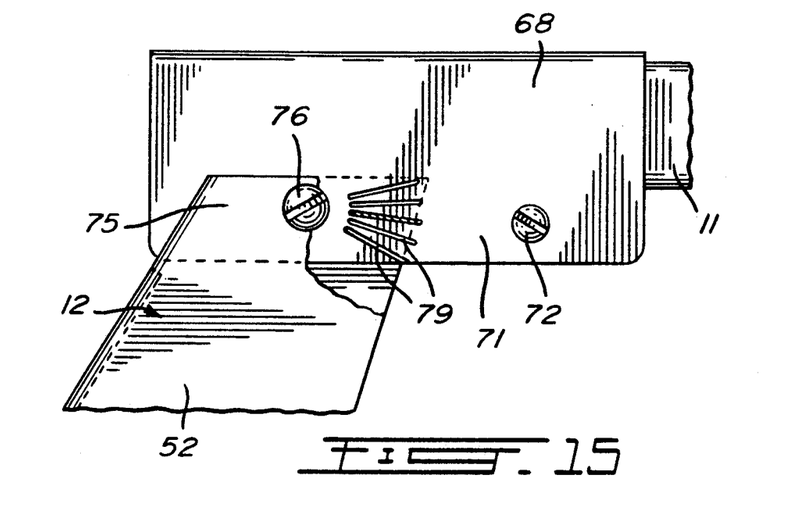
FIG. 15 is a fragmented side view showing the connecting of the rail to the support bracket.

Referring now to FIGS. 12, 13 and 15, it can be seen that the opposed support walls 52 of the brackets 12 and 12' are provided with a flange end section 75 for pivotally connecting the hollow rail connector 68 therebetween. The extension side walls 71 of the connector are secured between the flange end sections 75 by a pivot pin 76 and, depending on the arc of the roof of a vehicle, the connector 68 will self-adjust its angular position with respect to the walls 52. The screw 72 is then tightened to preserve the connected angle.

As shown in FIGS. 13 and 15, two or more slots 79 may be formed in an inner surface 77 of the opposed flange end section 75 and disposed on spaced radii of the pivot pin 76. An arresting protrusion 78 is formed on opposed wall extensions 71 for arresting engagement with one of the slots 79. As also shown in FIG. 13, the brackets taper outwardly to provide rigidity to its housing construction and are further provided with an inner transverse wall 80 to strengthen the opposed side walls 52.

Figure 17:
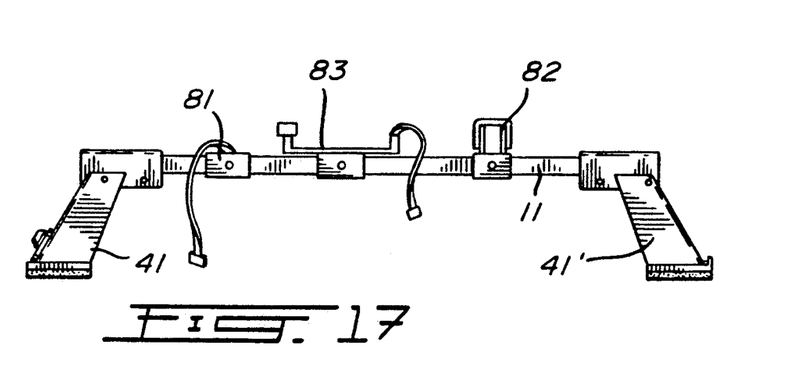
FIG. 17 is a side view showing the vehicle rack of the present invention having a variety of article attaching connectors secured to the rail.

As can be appreciated, with the vehicle rack of the present invention the rail and brackets are easily and quickly removable from the connecting bases which remain connected to the roof of a vehicle. Also, the rail 11 is easily removable from the support brackets and various article securing elements 81 of FIG. 17 can be slid onto the rail and secured thereto. These elements 81 may also be clamped onto the rail without having to be slid from the end thereof. As shown in FIG. 17, these elements may consist of a ski-holding bracket 82 or a bicycle support bracket 83, or simply a strap-attaching bracket, as shown at 81. It is, of course, within the ambit of the present invention to cover any obvious modifications of the preferred embodiment described herein provided such modifications fall within the scope of the appended claims. As an example only, there may be a single latch mechanism 50 in the securing bracket 12 engaging a single engageable pin 20 in the connecting base 14. Although, the brackets herein described are constructed of metal posts, other suitable material may be substituted.

As shown in FIG. 1, the connecting means, i.e., the band 16, may be formed by short hook brackets 16' which may hook onto the side edge of a sunroof opening 9,. When such is provided whereby not to interfere with the operation of the sunroof 8.

I claim:

1. A vehicle rack for securement over a roof of a vehicle, said rack comprising a support rail having opposed supporting brackets for maintaining said rail elevated transversely over the vehicle roof, said brackets being removably connected to a respective one of a pair of connecting bases, each of said connecting bases having attachment means for attaching same to a restraining portion of a vehicle adjacent said roof thereof with said connecting bases positioned on a respective side of said roof, connecting means is connected to said connecting bases to secure said bases, tensioning means for applying a tension force between said attachment means of said pair of connecting bases and the connecting means to rigidly connect said connecting bases on said roof, one of said connecting bases is a locking base provided with latch engageable means, one of said supporting brackets being a locking bracket having a latch mechanism actuable by a lever arm for engaging said latch engageable means of said locking base to immovably secure said brackets to said connecting bases, said lever arm being pivotally secured in said locking bracket and displaceable on a fixed rotation axis; a latch element is pivotally attached at one end to said lever arm on a latch pivot connection displaceable on an arc about said fixed rotation axis, means to displace said lever arm on said fixed rotation axis, said latch element having an engaging end to engage said latch engageable means, said lever arm when retracted from said locking bracket engageable means, the other of said connecting bases being provided with a bracket connecting means, said other supporting bracket having means to engage said bracket connecting means and being automatically disconnected by lifting said locking bracket from said locking base.

2. A vehicle rack as claimed in claim 1 wherein said tensioning means is an adjustable tensioning means.

3. A vehicle rack as claimed in claim 1 wherein said bracket connecting means is comprised of a pair of spaced holes provided in an outer vertical flange wall of said other of said bases for receiving a pair of locking tongues formed in said other supporting bracket.

4. A vehicle rack as claimed in claim 1 wherein said attachment means is a hook plate having a first hook end for clamping retention with said restraining portion of the vehicle, and a second hook end for removable retention in a hooking aperture provided in a base wall of each of said connecting bases.

5. A vehicle rack as claimed in claim 1 wherein said attachment means is a hook plate having a first hook end for clamping retention with said restraining portion of the vehicle, an attaching element at an opposed end of said hook plate for engagement in a selected one of two or said connecting base.

6. A vehicle rack as claimed in claim 1 wherein said connecting means is a band having at least a portion thereof of stretchable elastic material interconnecting said connecting bases with one another, said band constituting said tensioning means.

7. A vehicle rack as claimed in claim 1 wherein a key lock is secured to said locking bracket to immovably secure said lever arm in an engaged position with said hook end of said latch element engaged with said latch engageable means of said locking base.

8. A vehicle rack as claimed in claim 1 wherein article securement means are removably connected to said rail to secure various articles over said vehicle roof between a pair of transverse rails secured spaced apart over said roof.

9. A vehicle rack as claimed in claim 1 wherein a cap is removably secured over said connecting bases when said supporting brackets are not secured thereto.

10. A vehicle rack as claimed in claim 1 wherein said means to displace said lever arm is a finger engaging means, said engaging end being a free hook end, said latch engageable means is a fixed transverse element secured elevated over a bottom wall of said one of said connecting bases, said latch element extending between said lever arm and said fixed rotation axis, said lever arm when retracted from said bracket causing said latch pivot connection to be displaced in a predetermined direction on said arc about said fixed axis thereby causing said hook end to firstly move downwardly and out of engagement with said fixed transverse element, said latch element thereafter slidingly abutting a pin connector on said fixed rotation axis to guide said latch element and hook end away from said fixed transverse element for the removal of said locking bracket from said locking connecting base.

11. A vehicle rack as claimed in claim 10 wherein said fixed transverse element is a transverse pin secured between a pair of vertical flanges extending above said locking connecting base, said lever arm having two spaced apart latch elements secured thereto for engaging two spaced apart fixed transverse elements secured to said locking connecting base, said finger engaging means being a plate hingeably displaceable outwardly of an outer transverse wall secured between said support walls.

12. A vehicle rack as claimed in claim 2 wherein said adjustable tensioning means is a threadable element interconnecting one of opposed ends of said connecting means to one of said connecting bases, said threadable element being in threaded engagement with said connecting base whereby rotation of said threaded element in one direction pulls said flexible connecting means and applied said tension force between said attachment means.

13. A vehicle rack as claimed in claim 12 wherein said connecting base is a rectangular base having a flat bottom wall, a contour vertical wall about said bottom wall, and a cushioning pad secured under said bottom wall.

14. A vehicle rack as claimed in claim 13 wherein said locking connecting base has an opening disposed on a central transverse axis in said bottom wall adjacent an inner longitudinal edge of said bottom wall, a connecting housing secured above said bottom wall adjacent said opening and having a threaded bore aligned with said central transverse axis, one end of said connecting means having a vertical end wall with an aperture therein, said threadable element being a tightening bolt extending through said aperture with said end wall located in and protruding above said opening and aligned with said threaded bore, said threadable element being in threaded engagement with said threaded bore.

15. A vehicle rack as claimed in claim 14 wherein said threaded element is a bolt having a tool engageable free end, the other end of said flexible connecting means being secured to the other connecting base in a nonadjustable manner.

16. A vehicle rack as claimed in claim 14 wherein said flexible connecting means is a strap of flexible and nonextensible material, said strap having a protective material over at least a face thereof which is disposed in contact with said vehicle roof.

17. A vehicle rack as claimed in claim 14 wherein said flexible connecting means is a metal band having upwardly turned end portions constituting said vertical end wall, one of said vertical end walls having said aperture therein, the other vertical end wall being received in a slot formed in said bottom wall of said other connecting base adjacent said inner longitudinal edge thereof, said other vertical end wall being retained captive in said slot.

18. A vehicle rack as claimed in claim 1 wherein each said supporting bracket is provided with a pivotal rail connector in a top portion thereof for removably connecting said rail thereto.

19. A vehicle rack as claimed in claim 18 wherein said pivotal rail connector is a hollow housing connector for receiving an end portion of said rail therein, and means to lock at least one end of said rail to said housing connector of at least one of said pair of connecting brackets.

20. A vehicle rack as claimed in claim 19 wherein said means to lock at least one end of said rail is a lock screw to apply a clamping force on said rail in said hollow housing connector of said locking bracket.

21. A vehicle rack as claimed in claim 19 wherein said opposed support walls are provided with a flange end section for pivotally connecting said hollow housing connector therebetween by a connecting pivot pin, and means to lock said hollow housing at a precise angle with respect to said opposed support walls.

22. A vehicle rack as claimed in claim 21 wherein said means to lock said hollow housing at a precise angle comprises two or more slots formed on an inner surface of said opposed flange end sections and disposed on spaced radii of said pivot pin, and an arresting protrusion formed on opposed side walls of said hollow housing connector for arresting engagement with one of said slots.

23. A vehicle rack as claimed in claim 22 wherein said opposed support walls are inclined walls, said flange end section of each wall extending vertically and parallel to one another, said hollow housing connector being a tubular connector of rectangular cross-section.

* * * * *